May 13, 1958 C. T. GOVIN 2,834,450
COUNTING SYSTEM FOR STACKER
Filed April 4, 1957 2 Sheets-Sheet 1
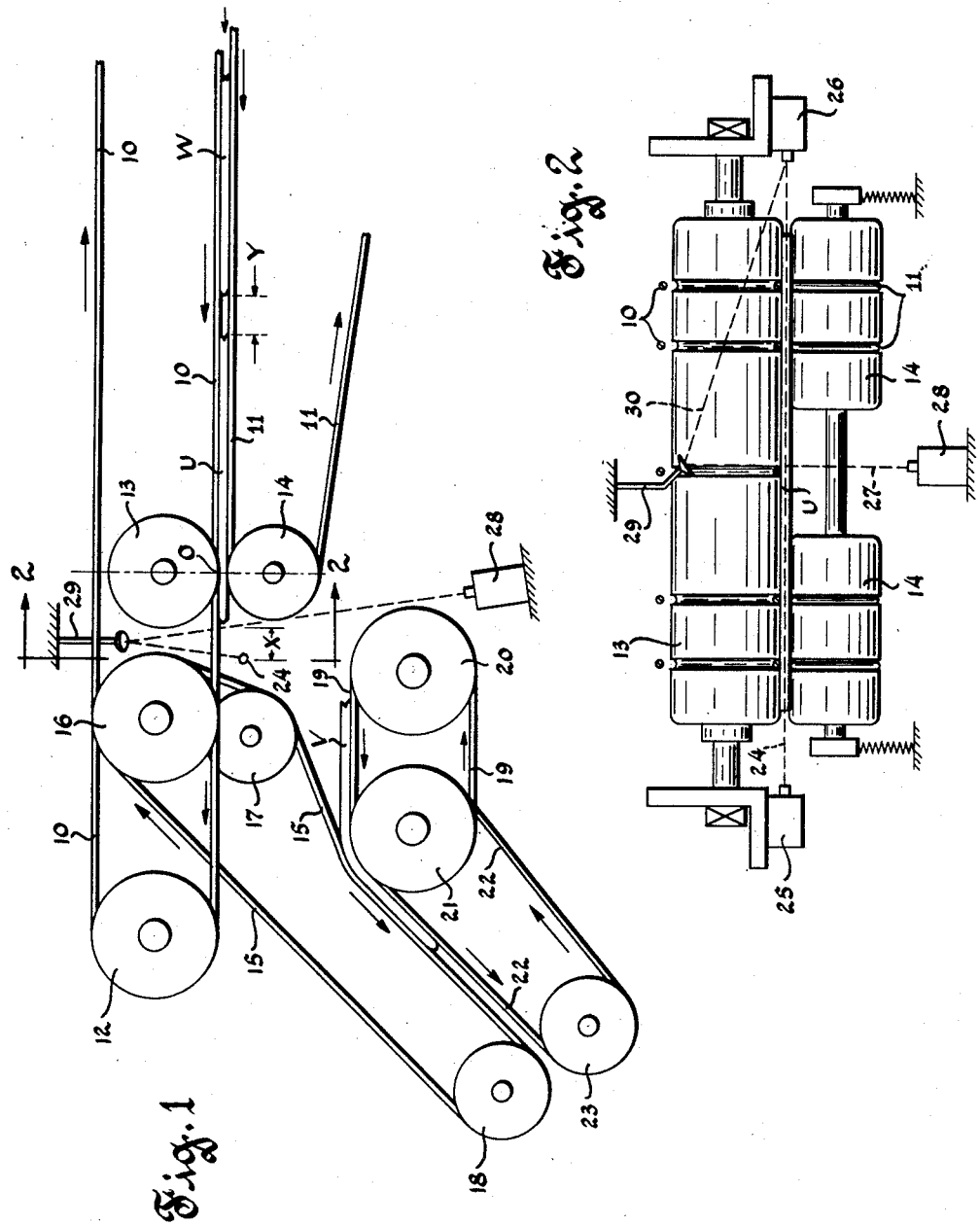
Inventor
Charles T. Govin
By H. R. Ratter
Attorney United States Patent Office 2,834,450
Patented May 13, 1958

2,834,450

COUNTING SYSTEM FOR STACKER

Charles T. Govin, Mattoon, Ill., assignor to Cutler-Hammer, Inc., Milwaukee, Wis., a corporation of Delaware Application April 4, 1957, Serial No. 650,735

10 Claims. (Cl. 198—40)

This invention relates to improvements in mechanism for conveying and counting flat, flexible articles delivered in a stream.

While not limited thereto, the present invention relates particularly to such mechanisms disclosed and claimed in the Howdle Patent No. 2,725,972.

In some conveying mechanisms newspapers or other flat flexible articles being conveyed are counted by moving their leading portions downward through a substantially horizontal light beam athwart their path thereby effectively reducing the amount of light impinging on a photoelectric device in line with said beam and causing said photoelectric device to actuate a counter mechanism. When articles are being conveyed in spaced apart (unlapped) relation, or if a gap occurs between articles being conveyed in normally overlapped relation, it is sometimes possible for the trailing portion of an article not overlapped by the article immediately behind it to flip upward occasionally into said beam thereby causing an additional count to be registered for an article previously counted. It is desirable, therefore, to effectively reduce the possibility of such tail flip being registered as a count.

Consequently, it is an object of the invention to provide improved means for counting flat flexible articles being conveyed in a stream.

Another object is to provide improvements in photoelectric control systems.

Still another object is to provide improved photoelectric counting mechanisms which reduce the possibility of counting errors.

A further object is to provide an improved photoelectric counting and control mechanism wherein a mirror can be substituted for a photoelectric device.

An additional object is to provide accurate counting mechanisms directly sensitive to the speed of the articles being counted and which are not mechanically geared to the speed of the conveying machine.

Other objects and advantages of the invention will hereinafter appear.

The accompanying drawings illustrates preferred embodiments of the invention which will now be described, it being understood that the embodiments illustrated are susceptible of various modifications with respect to details thereof without departing from the scope of the appended claims.

In the drawings:

Figure 1 is a schematic view in side elevation of a portion of a conveyor and counting mechanism incorporating the invention;

Fig. 2 is a view taken substantially along line 2—2 of Fig. 1;

Figure 3:
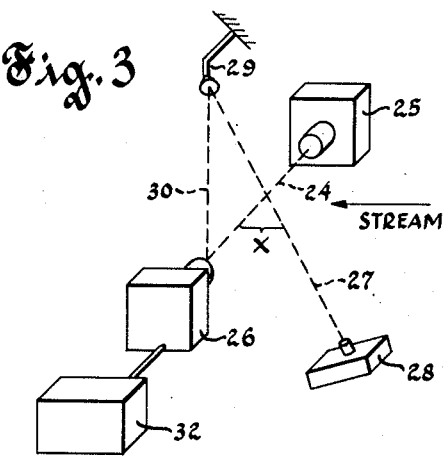
Fig. 3 is a schematic showing in perspective of the counter mechanism shown in Figs. 1 and 2.

Referring to Fig. 1, there is shown schematically a portion of a conveyor comprising upper wire belts 10 and lower wire belts 11. Belts 10 travel around a driven grooved roller 12 and bear on the lower side of a grooved idler roller 13. Belts 11 driven by roller means (not shown) travel around a grooved idler roller 14. A set of wire belts 15, which are generally disposed at an oblique angle to belts 10, travel around a driven grooved roller 16, around a grooved idler roller 17, and around a grooved idler roller 18. The wire belts 19, disposed for travel in parallel relation to belts 10, travel around a grooved idler roller 20 and around a driven grooved roller 21. The belts 22 travel around driven grooved roller 21 and around a grooved idler roller 23.

As shown in Figs. 1 and 2, a light beam 24 emanating from a light source 25 is disposed horizontally across the path of travel of the aforesaid belts and normally impinges on a photoelectric device 26 mounted in line with the source 25. A second light beam 27 emanating from an auxiliary light source 28 is disposed in a substantially vertical position upstream from said horizontal beam 24 with respect to the direction of travel of the articles being conveyed and normally impinges on a mirror 29 mounted in line with source 28. Mirror 29 is disposed so that reflected beam 30 normally impinges on photoelectric device 26.

The operation of the foregoing system will now be described.

Assume that the conveyor and counting systems are energized, that the belts are being driven in the directions indicated in Fig. 1, and that a stream of folded flexible articles, such as newspapers or the like, are being carried between the upper belts 10 and the lower belts 11 in spaced apart (unlapped) relation with folded edges leading. As each article, such as that designated U, advances between rollers 13 and 14 its leading portion is carried outwardly from between rollers 13 and 14 in abutting engagement with belts 10 through vertically disposed light beam 27 until it is brought into engagement along its folded edge against belts 15. Belts 15 at this point are travelling downwardly at an oblique angle with respect to belts 10 and 11 and thus pull the leading edge of the article U quickly downward. The leading portion of article U, between its leading edge and the point O on the line between the centers of rollers 13 and 14, is accordingly flipped downwardly through horizontally disposed light beam 24 toward belt 19. The trailing portion of article U passes out from between rollers 13 and 14, passes clear of vertically disposed light beam 27 and tends to drop down onto belts 19. At this moment due to the action of various forces trailing portions of article U may accidentally flip through or into horizontally disposed beam 24. By the time such trailing portion of an article drops onto belts 19 its leading portion has passed between belts 15 and 22 and the latter grip the same for transport therebetween as is shown in Fig. 1 by the article designated V.

It is to be understood that momentary reduction by a predetermined percentage of the amount of light normally effectively impinging on the photoelectric device 26 will cause a momentary change in the potential generated by said device. It is to be further understood from Fig. 3 that the potential of device 26 does not change unless both horizontal light beam 24 and vertical beam 27 (and thus reflected beam 30) are effectively interrupted simultaneously. In the latter event each such momentary change in potential caused by articles interrupting said beams can be made to effect a registration or count in any suitable electrically responsive counter mechanism associated therewith, such as indicated by reference numeral 32, to obtain either a totalization of the number of articles in a run or to afford a control function after a predetermined number of articles have been counted.

Figure 5:
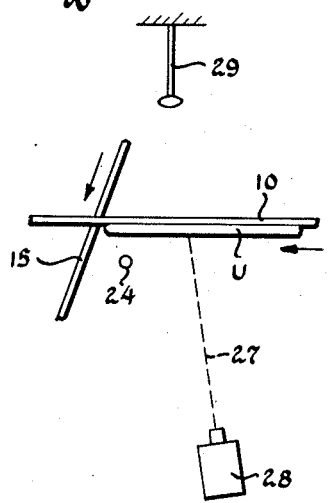
Figs. 5, 6 and 7 are detailed views in side elevation of portions of the conveyor and counting system shown in Fig. 1 illustrating the mode of operation of the invention.
Figure 6:
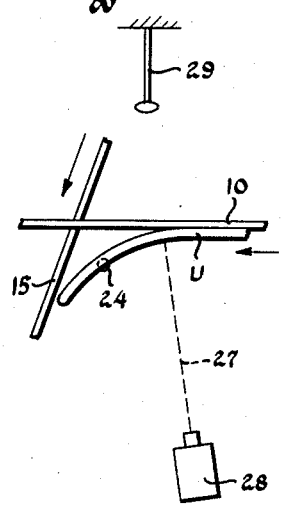
Figure 7:
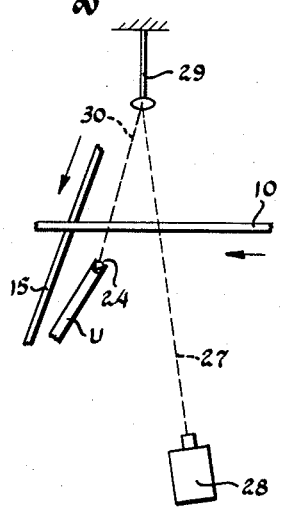

Referring to Figs. 1, 2 and 3, normally horizontal light beam 24 and reflected light beam 30 both impinge on photoelectric device 26. As the leading edge of article U advances toward belts 15, beam 27 will be interrupted first as shown in Fig. 5 but no count will register because beam 24 still effectively impinges on device 26. As the leading portion of article U is flipped downwardly through beam 24 as shown in Fig. 6, a count will register as the potential of device 26 changes momentarily. As article U continues in its path of travel the trailing portion thereof moves out from between rollers 13 and 14 and subsequently ceases to interrupt vertical beam 27 thereby permitting beam 27 to impinge on mirror 29 and reflected beam 30 to impinge on photoelectric device 26. At this instant device 26 is again being effectively illuminated from both sources. Should trailing portion of article U subsequently be flipped through or into horizontal beam 24 no count will register since device 26 is effectively illuminated by reflected beam 30 as shown in Fig. 7.

Figure 4:
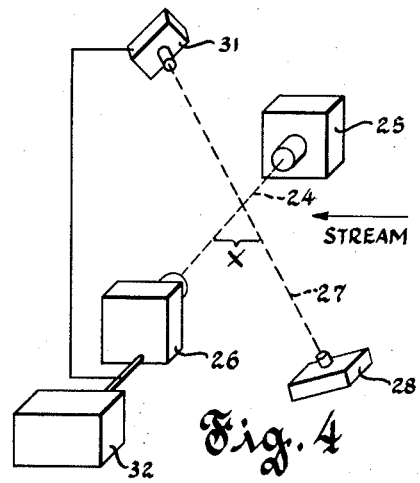
Fig. 4 is a view like Fig. 3 but showing an alternative form of counter mechanism incorporating the invention.

If preferred, mirror 29 may be eliminated from the system hereinbefore described and an auxiliary photoelectric device 31 electrically connected in parallel with photoelectric device 26 to electrically responsive counter mechanism 32, as will be understood from reference to Figs. 3 and 4, may be substituted therefore. Vertical light beam 27 shown in Fig. 4 may be disposed in the same position with respect to horizontal beam 24 and the article stream as is beam 27, depicted in Figs. 1, 2, 3, 5, 6 and 7, provided due allowance is made for any physical or structural limitations which may control installation of the auxiliary photoelectric device 31 in or upon the conveyor mechanism. It is understood from Fig. 4 that no count registers in mechanism 32 unless simultaneous potential changes occur in photoelectric devices 26 and 31, which changes are effected by simultaneous interruption of horizontal light beam 24 and vertical light beam 27. With the scheme depicted in Fig. 4 operatively associated with the conveyor mechanism, articles such as U act upon beams 27 and 24 in the same manner and with the same result as hereinbefore described in connection with the scheme shown in Fig. 3.

While the foregoing systems have been described in connection with a stream of articles in spaced apart (unlapped) relation, the systems are suitable for affording protection against multiple or false counting when gaps occur between articles being conveyed in normally overlapped relation freeing the trailing portion of some articles for possible tail flips.

Certain latitude is permitted in the relationship of the various belts, rollers, light sources, photoelectric devices, mirror, lightbeams, etc., but it has been found that for optimum efficiency the following factors and relationships, in addition to those pointed out in connection with Patent No. 2,725,972, should be carefully considered, or closely adhered to, as the case may be.

(a) The distance X between horizontal beam 24 and vertical beam 27, which projects upward from below the article stream and is behind the horizontal beam with reference to the direction of flow of the article stream, as shown in Figs. 1, 3 and 4, preferably is as small as possible so that accurate counting will result when the distance Y (see Fig. 1) between the trailing edges of article U and the leading edge of the following article such as W is extremely small.

(b) Vertical beam 27 must not be interrupted by article W while the trailing portions of article U are in a position to cause to interrupt horizontal beam 24.

(c) Vertical beam 27 must be located with respect to horizontal beam 24 so that the trailing portion of article U clears beam 27 before said trailing portion is in a position to possibly interrupt beam 24.

(d) Mirror 29 must be disposed above the article stream so that its reflected beam 30 can effectively impinge on photoelectric device 26 without beam 30 being interrupted directly by the article stream.

(e) Beams 24, 27 and 30 must not be interrupted by any portion of the conveyor mechanism. Fig. 2 shows how roller 14 has been split or divided to afford clearance for vertical beam 27.

(f) Light from sources other than 25 and 28 must not be permitted to impinge effectively on photoelectric devices 26 or 31, directly or by reflection.

I claim:

1. In a system for conveying and counting substantially flat, flexible articles, in combination, conveyor means for moving said articles in a given direction, a first light source disposed to project a first light beam across the path of travel of said articles, a second light source disposed to project a second light beam across the path of travel of said articles, said second beam disposed upstream of said first beam with respect to the direction of travel of said articles, light sensitive means disposed to have said first and second beams impinge thereon, electroresponsive registration means associated with said light sensitive means, said electroresponsive means registering when both said first beam and second beam are effectively interrupted simultaneously, and means for driving said conveyor means for conveyance of said articles and to effect in succession passage of an article into said second beam, directing of the leading portion of said article through said first beam while said second beam is interrupted by portions of said article, and movement of said article clear of said second beam while portions of said article is in a position wherein it could be flipped through said first beam again.

2. In a system for conveying and counting substantially flat, flexible articles, conveyor means for moving said articles in a given direction, a first light source disposed to project a first light beam across the path of travel of said articles, a light sensitive device disposed to have said first light beam normally impinge thereon, an electric responsive counter mechanism associated with said device, a second light source disposed to project a second light beam across the path of travel of said articles, said second light beam disposed upstream of said first beam with respect to the direction of travel of said articles, reflecting means disposed to have said second light beam normally impinge thereon and reflect said second light beam to impinge on said light sensitive device, and means for driving said conveyor for conveyance of said articles to effect in succession interruption of said second light beam by an article, directing of the leading portions of said article through said first light beam to register a count of said article while said second beam is interrupted, movement of said article clear of said second light beam while trailing portions thereof are in a position to possibly intersect said first light beam again accidentally, and to move each of said articles away from said first light beam.

3. The combination according to claim 2 wherein said first light beam is disposed horizontally and said second beam substantially vertically across the path of travel of said articles.

4. In a system for conveying and counting substantially flat, flexible articles, in combination, conveyor means for moving said articles in a given direction, a first light source disposed to project a first light beam across the path of travel of said articles, a first light sensitive device disposed to have said first light beam normally impinge thereon, a second light source disposed to project a second light beam across the path of travel of said articles, said second beam disposed upstream of said first beam with respect to the direction of travel of said articles, a second light sensitive device disposed to have said second light beam normally impinge thereon, electroresponsive counter means associated with said first and second light sensitive devices, and means for driving said conveyor means to effect movement of each of said articles in succession through said second beam, through said first beam while said second beam is still interrupted, clear of said second beam while portions of said articles are in position to accidentally flip into said first beam again, and then clear from said first beam before another of said articles is moved into said second beam.

5. The combination according to claim 4 wherein said first light beam is disposed substantially horizontally and said second light beam is disposed substantially vertically across the path of travel of said stream.

6. The combination with a system for conveying flat, flexible articles and directing each through a light beam normally impinging on a photoelectric device controlling a counter, to cause interruption of the beam and consequent actuation of the counter, of means for preventing false operation of said counter caused by an article being flipped through said light beam more than once comprising means affording projection of a second light beam across the path of the articles upstream of the first mentioned light beam and preventing operation of said counter unless said second light beam is interrupted by an article when said first light beam is also interrupted thereby.

7. The combination with a system for conveying flat, flexible articles and directing each successively through a light beam normally impinging on photoelectric means controlling a counter to cause interruption of said beam and consequent actuation of said counter, of means for preventing actuation of said counter caused by the trailing portion of an article being flipped through said beam comprising means affording projection of a second light beam across the path of the articles upstream of said first mentioned light beam onto said photoelectric means for preventing operation of said counter unless said second light beam is interrupted by an article when said first light beam is also interrupted thereby.

8. The combination according to claim 7 wherein said first mentioned light beam is substantially horizontally disposed and said second light beam is vertically disposed.

9. The combination according to claim 8 wherein said second beam is reflected onto said photoelectric means by a mirror disposed in the path of said second beam.

10. The combination according to claim 8 wherein said photoelectric means comprises a first photoelectric device upon which said first mentioned beam impinges and a second photoelectric device connected in parallel with said first photoelectric device to said counter upon which said second beam impinges.

References Cited in the file of this patent

UNITED STATES PATENTS 2,725,972     Howdle _____ Dec. 6, 1955